US011385066B2

United States Patent
Oswald et al.

(10) Patent No.: US 11,385,066 B2
(45) Date of Patent: *Jul. 12, 2022

(54) VEHICLE NAVIGATION AND CONTROL SYSTEM AND METHOD

(71) Applicant: Westinghouse Air Brake Technologies Corporation, Wilmerding, PA (US)

(72) Inventors: James A. Oswald, Coggon, IA (US); Jeffrey D. Kernwein, Cedar Rapids, IA (US); Michael Bratcher, Azle, TX (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 281 days.

This patent is subject to a terminal disclaimer.

(21) Appl. No.: 16/549,981

(22) Filed: Aug. 23, 2019

(65) Prior Publication Data

US 2019/0383625 A1 Dec. 19, 2019

Related U.S. Application Data

(63) Continuation-in-part of application No. 15/592,760, filed on May 11, 2017, now abandoned, and a continuation-in-part of application No. 15/382,922, filed on Dec. 19, 2016, now Pat. No. 10,392,040.

(51) Int. Cl.
*G01C 21/34* (2006.01)
*B61L 25/00* (2006.01)

(52) U.S. Cl.
CPC .............................. *G01C 21/3453* (2013.01)

(58) Field of Classification Search
CPC ........ B61L 25/00; B61L 25/02; B61L 25/023; B61L 25/028; B61L 25/04; B61L 25/06; B61L 27/00; B61L 27/04
See application file for complete search history.

(56) References Cited

U.S. PATENT DOCUMENTS

| | | | |
|---|---|---|---|
| 10,392,040 B2 * | 8/2019 | Oswald | B61L 15/0027 |
| 2013/0131968 A1 * | 5/2013 | Wills | B61L 27/0027 701/117 |
| 2014/0136025 A1 * | 5/2014 | Cooper | G08G 9/00 701/2 |
| 2015/0269521 A1 * | 9/2015 | Knapp | G06Q 10/08355 705/338 |
| 2016/0244078 A1 * | 8/2016 | Noffsinger | B61L 3/10 |
| 2016/0355199 A1 | 12/2016 | Kernwein et al. | |

(Continued)

OTHER PUBLICATIONS

Examination Report No. 1 dated Feb. 27, 2020 for corresponding Australian Patent Application No. 2017379589.

(Continued)

*Primary Examiner* — Robert J McCarry, Jr.
(74) *Attorney, Agent, or Firm* — Christopher R. Carroll; The Small Patent Law Group LLC

(57) ABSTRACT

A controller is provided that can receive or determine at least one first location associated with at least a first vehicle belonging to a vehicle group; receive or determine at least one second location associated with at least a second vehicle; and determine a route or lane from a plurality of possible routes or lanes on which the vehicle group is located based at least partly on the at least one first location and on the at least one second location.

18 Claims, 10 Drawing Sheets

(56) References Cited

U.S. PATENT DOCUMENTS

2017/0043797 A1    2/2017   Allhouse et al.

OTHER PUBLICATIONS

International Preliminary Amendment for corresponding International Application No. PCT/US2018/018676 dated Nov. 12, 2019 (9 pages).
Canadian Office Action dated Jul. 5, 2019.
Examination Report No. 1 dated Sep. 15, 2021 for corresponding Australian Patent Application No. 2020239650.
Examination Report No. 1 dated Dec. 15, 2021 for corresponding Australian Patent Application No. 2018264854 (3 pages).

* cited by examiner

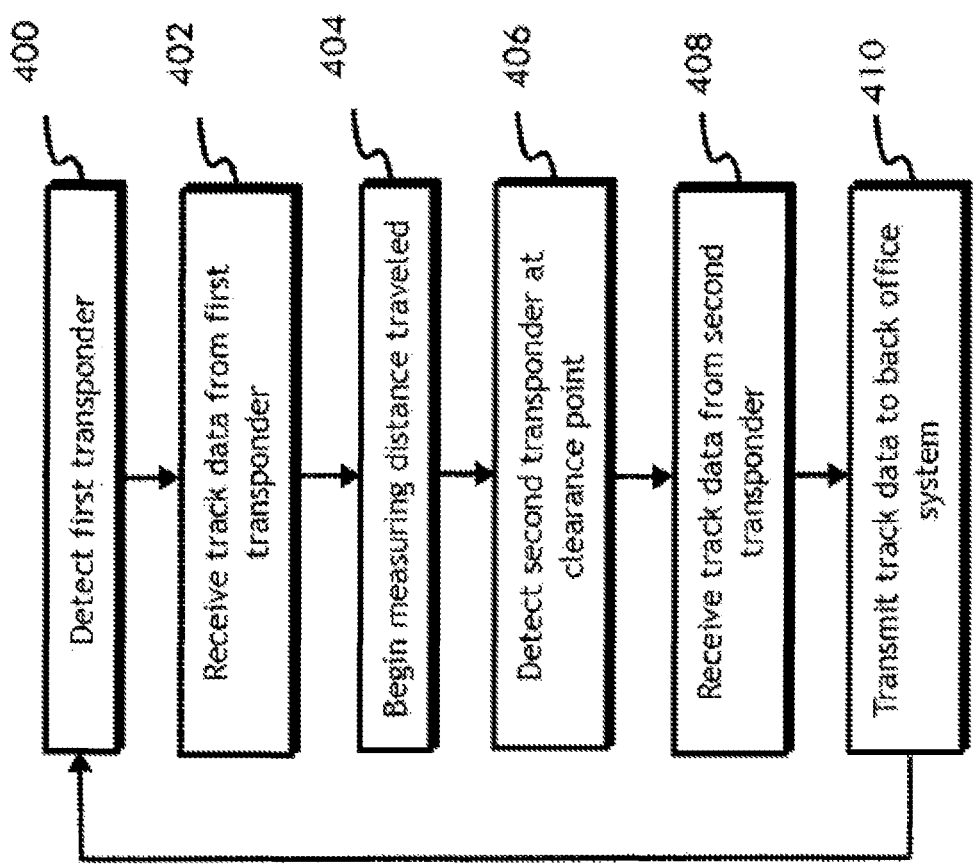

VEHICLE NAVIGATION AND CONTROL SYSTEM AND METHOD

CROSS-REFERENCE TO RELATED APPLICATIONS

This application is a continuation-in-part of U.S. patent application Ser. No. 15/382,922, filed on Dec. 19, 2016; and a continuation-in-part of U.S. patent application Ser. No. 15/592,760, filed on May 11, 2017. The entire subject matter of each of these applications is incorporated herein by reference.

BACKGROUND

Technical Field

Embodiments of the subject matter disclosed herein relate to a vehicle navigation and control system and method.

Discussion of Art

Vehicle systems and networks exist throughout the world, and, at any point in time, a multitude of vehicles, such as cars, trucks, buses, trains, and the like, are travelling throughout the system and network. With specific reference to trains travelling in a track network, the locomotives of such trains are typically equipped with or operated using train control, communication, and management systems (e.g., positive train control (PTC) systems), such as the I-ETMS® of Wabtec Corp. In order to effectively manage all of the trains, navigation and enforcement systems and processes are implemented, both at the train level and the central dispatch level.

BRIEF DESCRIPTION

In one embodiment, a controller is provided that can receive or determine at least one first location associated with at least a first vehicle belonging to a vehicle group; receive or determine at least one second location associated with at least a second vehicle; and determine a route or lane from a plurality of possible routes or lanes on which the vehicle group is located based at least partly on the at least one first location and on the at least one second location.

In one embodiment, a system is provided for determining a direction of travel of a vehicle group including at least two control vehicles on a route network having a plurality of routes. The system includes a computer that can receive or determine a direction of orientation of at least one of the control vehicles relative to the route; receive or determine a throttle position of the at least one of the control vehicles; and determine based on the direction of orientation and the throttle position the direction of travel of the vehicle group relative to the route.

In one embodiment, a method includes receiving or determining at least one first location associated with at least a first vehicle belonging to a vehicle group; receiving or determining at least one second location associated with at least a second vehicle; and determining a route or lane from a plurality of possible routes or lanes on which the vehicle group is located based at least partly on the at least one first location and on the at least one second location.

BRIEF DESCRIPTION OF THE DRAWINGS

The subject matter described herein includes descriptions of non-limiting embodiments, with reference to the attached drawings, wherein below:

FIG. 9 illustrates a flowchart of a method for determining a position of a vehicle group device according to one embodiment.

DETAILED DESCRIPTION

Embodiments of the subject matter disclosed herein relate to a system and method for determining a location of a vehicle and/or a vehicle group to which the vehicle belongs. The vehicle location may be with reference to a particular route, which is one of a plurality of possible routes, or a particular lane, channel, or envelope of a known route, which is one of a plurality of possible lanes, channels, or envelopes that make up a route. In one embodiment, the system and method may glean information about an operational state of a switch or intersection control device.

Figure 1:
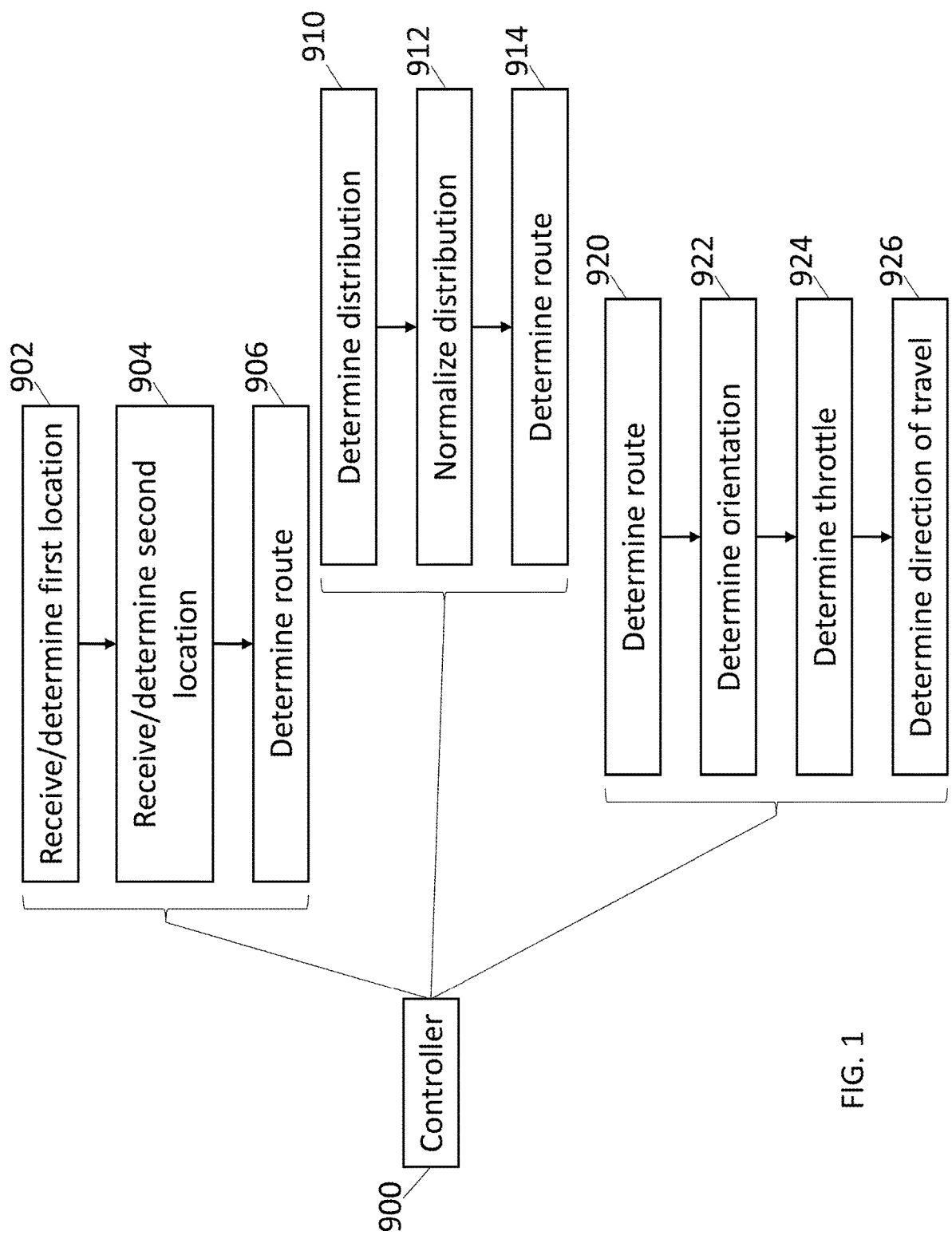
FIG. 1 is a diagrammatic view of a controller for determining route or lane location and direction of travel according to one embodiment.

With reference to FIG. 1, a diagram is shown of a controller 900 according to one embodiment. The controller is operable to receive or determine at least one first location associated with at least a first vehicle belonging to a vehicle group (902); to receive or determine at least one second location associated with at least a second vehicle (904); and determine a route or lane from a plurality of possible routes or lanes on which the vehicle group is located based at least partly on the at least one first location and on the at least one second location (906). Optionally, the controller may determine a distribution of the at first location and the second location (910) and to normalize the distribution to route centerline data (912). At least one of the first location and the second location may include multiple location data points over a determined period. The controller may determine the route of the plurality of possible routes on which the first vehicle is located based at least partly on the normalized distribution (914).

The controller may determine the route or lane from the plurality of possible routes or lanes on which the vehicle group is located based at least partly on a spatial relationship of the first vehicle to the second vehicle (920). And, the controller may receive or determine a direction of orientation of the first vehicle (922); receive or determine a throttle position of the first vehicle (924); and determine, based at least in part on the direction of orientation and on the throttle position, a direction of travel of the vehicle group on the route or lane (926).

Figure 2A:
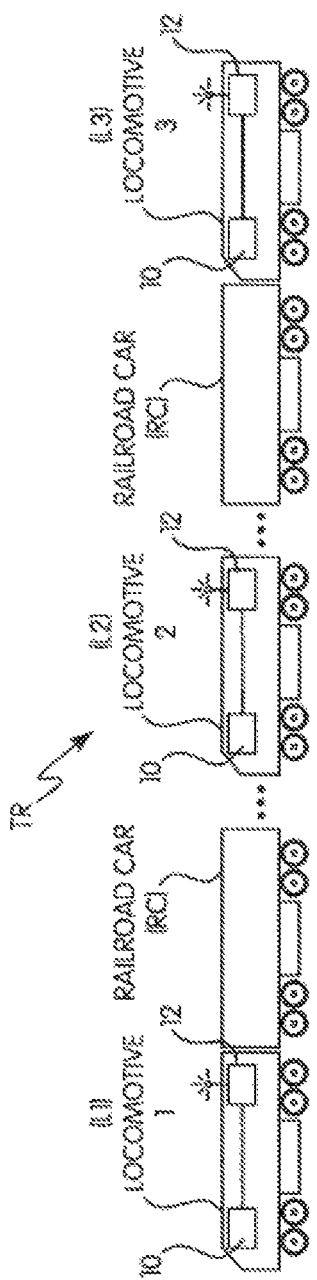
FIGS. 2A and 2B are schematic views of a system for determining route or lane location and direction of travel according to one embodiment.
Figure 2B:
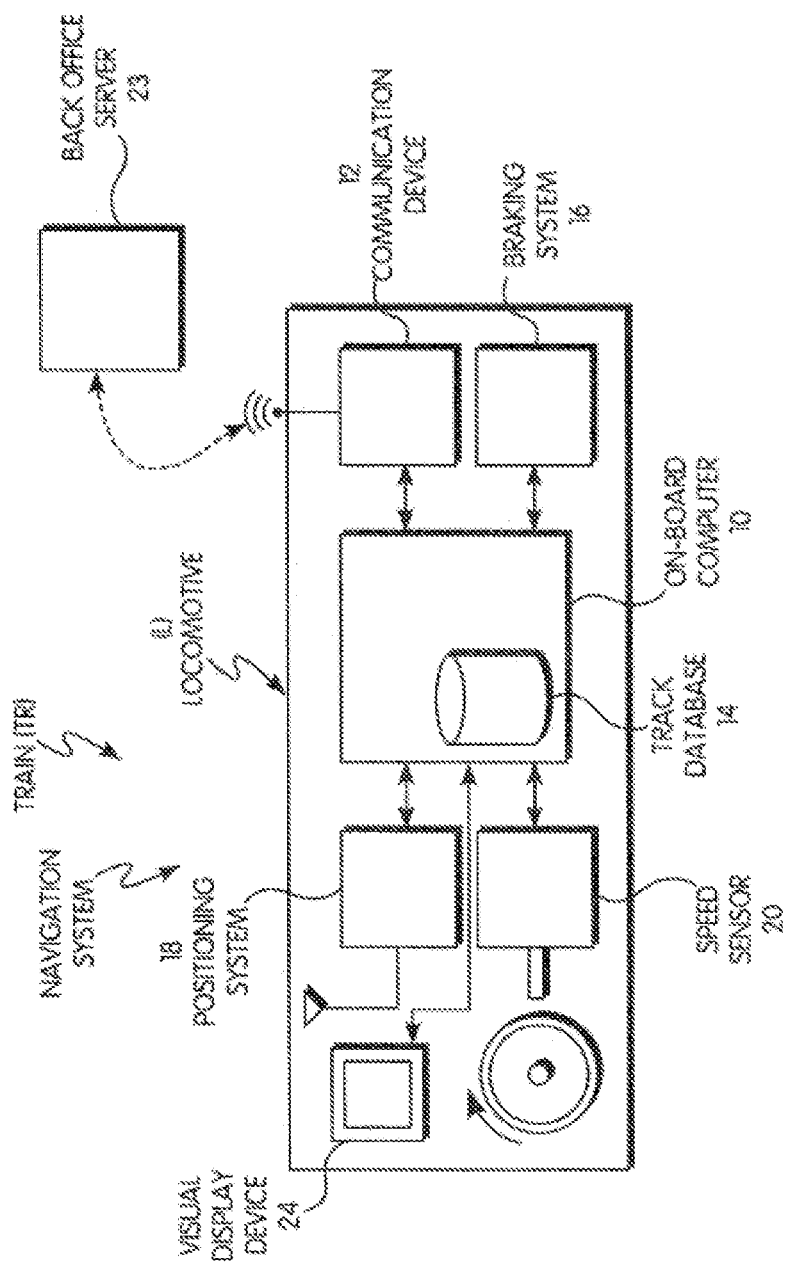

With reference to FIGS. 2A and 2B, the methods and systems described herein may be used in connection with control vehicles or cars that may be in a vehicle group. In the illustrated embodiment, the control vehicle can be a locomotive (L) and the vehicle group can be a train (TR) that include the locomotive and a plurality of rail cars coupled to the locomotive. Optionally, the vehicles may be another type of vehicle, such as automobiles, buses, trucks, marine vessels, aircraft (manned or unmanned), agricultural vehicles, mining vehicles, or other off-highway vehicles. The control vehicles or control cars that may be positioned at the forefront, the rear, or intermediately in the vehicle group relative to the direction of travel. As the direction of travel changes, the disposition of the vehicles or control cars may change relative to the vehicle group, and similarly, the vehicle group's constitution and order may change. The methods and systems described herein may be used in connection with a swarm, a platoon, an "electrical multiple unit" (EMU) or "diesel multiple unit" (DMU) configurations. The vehicle group may include only one control vehicle and/or some or no other vehicles. Multiple vehicles or control cars may be included in the vehicle group to facilitate the reduction of the vehicle group to match with passenger (or some other) demand or requirement. Further, the method and systems described herein can be used in connection with commuter vehicle groups, freight vehicle groups, push-pull vehicle group configurations, and/or other vehicle group arrangements and systems. The vehicle group may be separated into different configurations (e.g., other vehicle groups) and moved in either a first direction and/or a second direction. The configuration or arrangement of vehicles, control cars, and/or other vehicles may be designated as a vehicle group and/or a consist. Also, an auxiliary vehicle may be included in the vehicle group. Suitable auxiliary vehicles may include a maintenance vehicle, an inspection vehicle, a drone craft, a multi-mode vehicle (e.g., equipped to ride both on a road and on the rails of the track, or on land and in the water) and/or the like.

The embodiment shown may determine a track location and a direction of travel. The system may include a controller or computer 10, a communication device 12, a vehicle group management computer, a remote server, a back-office server 23, a wayside device, a vehicle group control and dispatch system, a networked computer system, or a combination of two or more thereof. In one embodiment, a traction control or braking system 16 may be included. A suitable navigation system may include one or more of a GPS system 18, a wheel tachometer (not shown), or a speed sensor 20. Other navigation systems may include an inertial navigation system, and a propulsion motor with an encoder. The navigation system may include a visual display device 24 (or operator interface). The operator interface may provide information and data to and from the operator.

A suitable controller or computer may include an on-board computer, a remotely located or remote computer or server, a vehicle group management computer, an on-board processing system, and/or the like. A suitable vehicle group control and dispatch system may include the i-ETMS and the Movement Planner systems available from Wabtec Corporation. In one embodiment, the steps in the system, process, and method discussed hereinafter may be implemented and/or executed on-board a control vehicle. In other embodiments, some or all of the steps in the system, process, and method discussed hereinafter may be implemented and/or executed by a computer or processor that may be remote from the vehicle group, where the remote computer or processor may be in direct or indirect communication with the communication device of a vehicle in the vehicle group. Suitable remote computers or processors may include a central controller, a back-office server, a remote server, central dispatch, back-office PTC components, various wayside devices, such as signal or switch monitors, or other off-board devices that communicate with an on-board controller.

In one embodiment, the vehicles of the vehicle group each may communicate with each other using a vehicle-to-vehicle communication system. Alternatively or additionally, the vehicles may all communicate back to an off-board system that controls or otherwise relays instructions and/or information to the vehicles; and, according to one aspect the off-board system communicates with one (or a few) vehicles in the vehicle group (that is, the control vehicle(s)) that in turn communicate with the remaining vehicles in the vehicle group. In other embodiments, communication may occur with and/or between multiple vehicle groups. Further, the makeup of a vehicle group may be dynamic, with vehicles joining or leaving one vehicle group, while then leaving or joining another vehicle group. The system manages the handoff in communication and/or control for such group transitions.

In one embodiment, the system may determine a route location and a direction of travel for a vehicle group including a control vehicle. A system architecture that may support the functionality of at least some of the methods and systems described herein includes the vehicle group management computer or controller, a positioning device or navigation system, and communication equipment. The control vehicle(s) may be equipped with the controller capable of implementing or facilitating a vehicle group action and the communication device in communication with the controller and capable of receive, transmit, and/or process data signals. While the communication device may be a wireless communication device, as discussed herein, this communication device may transmit, process, and/or receive signals over a vehicle powerline, using an ECP component, using fiber optics, wirelessly, through the rails, and/or the like.

The vehicle group may optionally include one or more other vehicles. Example of other vehicles that are not in communication with the system controller include railcars (RC) that, with a locomotive, constitute a train. In one embodiment, a control vehicle may be communicatively coupled with the other vehicles in the vehicle group. The vehicles in the vehicle group may be communicatively coupled and/or mechanically coupled (in either instance, the vehicle group may be sometimes referred to as a consist, a platoon or a swarm). The vehicle group may include a plurality of control vehicles (L1, L2, L3) and a plurality of other vehicles (such as rail cars (RC) in the illustrated embodiment). In another embodiment, the vehicle group may include only a single control vehicle and no other vehicles.

Suitable communication devices may facilitate the communications between controllers in one or more of the control vehicles or control cars of a vehicle group, communications with a wayside device, e.g., signals, switch monitors, wayside devices, and the like, and/or communications with a remote server. Remote servers may include cloud-based systems or edge devices. Examples may include a back-office server, a central controller, central dispatch, and/or the like. The system may interface with a route database 14. A route database may include information about route positions or locations, grades, curvatures, number of lanes, intersections and switch locations, crossing locations, group make up and identification, and the like. Additional information may include route heading changes, e.g., curves, distance measurements, grades, etc. Suitable vehicle group information may include the number of control vehicles or control cars, the number of other vehicles, the total length of the vehicle group, the specific identification numbers of each control vehicle. Additional information may include manifest information, freight type and amounts, passenger information, and the like. Yet other information may include the model and type of propulsion systems available, fuel levels, equipment health and status, age of equipment, and the like. In one embodiment, the software type and version information may be included.

Suitable traction control or braking systems may include propulsion and braking systems that propel and/or brake the vehicle. The traction control system may include, or be coupled with, an energy source (such as a DC bus), power electronics (for managing the electricity), and one or more electric motors. The motors may be used to propel the vehicle and, in dynamic braking mode, may be used to reduce or retard the speed of a vehicle. In one embodiment, by supplying a controlled amount of electrical current to the traction motor the traction control system may hold the vehicle in place even against the pull of gravity (such as when the vehicle is on a hill or a grade). The braking system may be a dynamic braking system, such as described, or may be a friction braking system. The braking system may engage to reduce a speed of the vehicle or may hold a vehicle in place even against the pull of gravity (such as when the vehicle is on a hill or a grade).

The controller may be located in or on a control vehicle in the vehicle group, and the controller may include or may be in communication with the track database populated with data and/or which receives specified data and information from other vehicle groups, remote servers, back-office servers, central dispatch, and/or the like, where this data may include track profile data, vehicle group data, information about switch locations, track heading changes (e.g., curves, and distance measurements), vehicle group consist information (e.g., the number of vehicles, the number of cars, the width and/or length of the vehicle group), and/or the like. Optionally, another type of vehicle group management system can be used within the context and scope of the inventive subject matter.

During operation, navigation or position reports may drift around within an accuracy bubble over time and space. The location or position information from a single vehicle may use aspects of the inventive subject matter to distinguish one route from another where the vehicle may be on one of plurality of available routes. For example, with a GPS accuracy of about 10 ft. (shown by the circles in FIG. 3) and a minimum or other lower limit on route spacing of about 14 ft., a single position report (by itself) from a vehicle can leave ambiguity in determining on which route a vehicle is located. Position X, associated with Locomotive 1, is closer to Track B than Track A. A schematic view of a vehicle group in an example track network is shown that can determine and distinguish a specific route, lane or track that is occupied by a vehicle. It may indicate a direction of travel of a vehicle group. The vehicle group may include at least two control vehicles or control cars (L1, L2) and, optionally, a non-control car (RC). The routes in this example are tracks, and the tracks may form a track network having a plurality of tracks (Track A, Track B). Optionally, the tracks can represent roads, highways, waterways, air paths, ground paths, etc.

During operation the controller of the vehicle can receive GPS position reports including GPS coordinates from the positioning system on-board the control vehicles (L1, L2) of the vehicle group. The communication device(s) of the control vehicles can transmit position reports to the other vehicles (control vehicles or otherwise) in the vehicle group and/or to the back-office server. The back-office server can transmit the position reports received from a vehicle in the vehicle group to the other vehicles in the vehicle group and/or to the other vehicles in the other vehicle groups. Location information associated with vehicles in the track network can thus be shared between the vehicles, the back-office server, and/or other computing devices in a PTC system.

The controller may determine a lane, track or envelope on or in which the vehicle (and by implication, the vehicle group) may be located and, optionally, a direction of travel of the vehicle group based at least partly on the available location information. In one embodiment, the controller of one or more of the vehicles (L1, L2) can analyze the position information from multiple vehicles (L1, L2) in the same vehicle group or consist to determine which lane or track is occupied by each or all of the vehicles in the vehicle group. The controller of one or more of the vehicles (L1, L2) and/or a remote computer can determine based at least in part on consist information, vehicle-to-vehicle spacing, optical sensor data, radar data, lidar data, signal strength (of, for example, communication devices), determined vehicle orientation (particularly when mechanically coupled vehicles form part of the vehicle group), wayside device information, reference to beacons (vehicle mounted and/or wayside mounted), and the like. Consist information may include a consist message or position report from Vehicle 2, that Vehicle 2 is in the same vehicle group or consist as Vehicle 1, that Vehicle 2 has on-board sensors indicating that Vehicle 2 is in the extreme right lane (no lanes sensed to the right+lanes sensed to the left), and that Vehicle 1 is directly behind Vehicle 2 and within rear-facing lidar sensor of Vehicle 2. The system may conclude that, based at least in part on the available location information, that Vehicle 2 is in a particular lane and Vehicle 1 is also in that same lane and behind Vehicle 2 relative to the direction of travel. The spatial relationship may be used to determine a location of one or the other of the vehicles. Discrepancies between Vehicle 1 location information may be handled using, for example, determined threshold values for accuracy and location. That is, if it is reasonable that Vehicle 1 is behind Vehicle 2 based on a margin of error, then the location of Vehicle 1 is accepted. If it is unreasonable (e.g., the determined location of Vehicle 1 is outside of the margin of error based on the location information from Vehicle 1), then an alert is generated. In one embodiment, the vehicles involved are moved to a safe stop mode.

In one embodiment, the back-office server can receive information including the position of each vehicle in the vehicle group from the central dispatch, e.g., a computer-aided dispatch (CAD) system. The messages from the central dispatch may include a field that indicates the position of each vehicle in the vehicle group. The back-office server can receive position reports from each vehicle in the vehicle group. The position reports include earth-centered, earth-fixed (ECEF) coordinates for the location of the vehicle within the uncertainty of the GPS system. This may be used, in one embodiment, to set an acceptable margin of error for location calculations.

Figure 3:
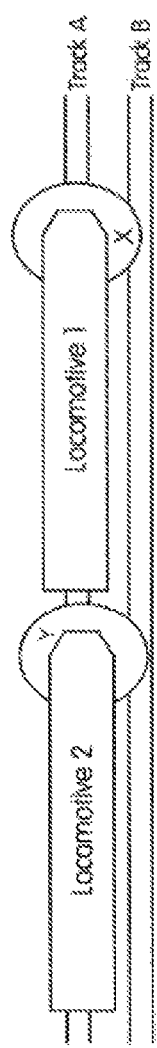
FIG. 3 is a schematic view of a vehicle group in an example route or lane network according to one embodiment.

As shown in the example of FIG. 3, position X, associated with Vehicle 1, may be closer to Track B than Track A, even though Vehicle 1 may be actually located on Track A. Accordingly, the actual location of position X may be ambiguous (e.g., based only on the location information associated with Vehicle 1, that is, position X, whether Vehicle 1 may be on Track A or Track B). The controller may determine a distribution of the locations associated with the vehicle and the other locations associated with the other vehicle and normalize the distribution to track centerline data and determine the track of the plurality of tracks on which the vehicle group may be located based at least partly on the normalized distribution. For example, the controller of one or more of the vehicles (L1, L2) can use the position Y, associated with Vehicle 2, in combination with the position X, associated with the Vehicle 1, to form a distribution of location information and normalize the distribution of the location information associated with the positions X and Y to track centerline data. The track centerline data may be stored in and retrieved from the track database and/or the back-office server and includes at least data or information sufficient to determine the centerline C (i.e., the center between the rails along a section of track T) of the track T upon which the vehicle group may be located or traversing. The controller of one or more of the vehicles (L1, L2) can determine based on the normalized distribution that the vehicle group may be on Track A and, thus, that the Vehicle 1 may be on Track A.

For example, the controller of one or more of the vehicles (L1, L2) can compare the positions of vehicles known to be in the same vehicle group against track database information including the track centerline location and any switches within the track. The position(s) from any one vehicle may be ambiguous in determining which track the vehicle may be on because an uncertainty of the position may allow the position to be valid for a vehicle on different tracks that may be within close proximity. However, position reports from other vehicles may be distributed within their uncertainty. By combining the position reports from more than one vehicle (L), the controller of one or more of the vehicles (L1, L2) can determine a normalized position that more clearly indicates the track that the vehicle group including the vehicle occupies. For example, if Vehicle 1 reports a position X that may be ambiguous (due to uncertainty) as to whether the vehicle group may be located on Track A or Track B. A vehicle on either track A or B could report that position. However, the position report Y from Vehicle 2 may be too far from Track B (beyond uncertainty limits with respect to the track centerline of Track B) and, therefore, must be associated with a vehicle on Track A, because there may be no other nearby tracks. By combining the information including the position of each vehicle in the vehicle group received from the central dispatch, which indicates that Vehicle 1 and Vehicle 2 may be in the same vehicle group, and utilizing a track database that indicates there may be no switches on the track between Vehicle 1 and Vehicle 2, the location of Vehicle 1 can be determined to be on Track A, because the Vehicle is in the same vehicle group as the Vehicle 2 and the Vehicle 2 must be on Track A.

Figure 4:
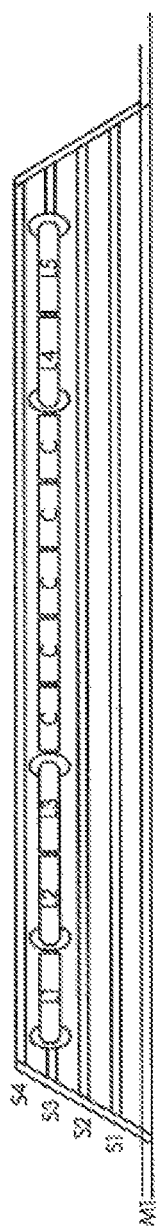
FIG. 4 is a schematic view of a vehicle group in an example route network according to one embodiment.

A number of control vehicles (L1, L2, L3, L4, L5) as shown in FIG. 4 in a vehicle group may allow the controller of one or more of the vehicles to reduce an uncertainty associated with a lane or track location determination by using positions associated with the greater number of vehicles to form the distribution and normalize the distribution to the track centerline data. For example, the greater number of vehicles enables the controller or back-office server to determine the normalized distribution based on a greater number of distribution points. This may provide relatively greater accuracy in determining the track on which the vehicle group is actually located.

In one example, the location associated with the control vehicle of the vehicle group is formed from a plurality of locations associated with multiple other vehicles of the vehicle group. This may be information collected over a period of time. For example, the controller of one or more of the vehicles (L1, L2) can receive multiple GPS position reports including location information, such as, GPS coordinates, from the positioning system on-board the same vehicle. In one embodiment, the controller or back-office server can receive multiple position reports from some or all of the vehicles of a vehicle group. The use of multiple position reports from the same vehicle to determine the distribution of location information can reduce the uncertainty associated with a track location determination because a GPS position of a stopped vehicle drifts around over time within an uncertainty bubble.

The controller may receive or determine a relative position of the control vehicle and another vehicle of the vehicle group in a lane or envelope, or on a track, receive or determine a direction and orientation of the control vehicle, and determine based at least in part on the direction and orientation the direction of travel of the entire vehicle group.

The controller of at least one of the control vehicles can receive or determine consist information indicating the relative position of the control vehicle(s) in the vehicle group and a direction of orientation of at least the first control vehicle (L1). The controller of another of the vehicles can receive the orientation of the lead (first) vehicle (L1). The orientation of the lead (first) vehicle (L1) may be either 1 for a front orientation or 2 for a back orientation, or another nomenclature or naming schema may be used. In one embodiment, this orientation can be confirmed by another data source, even by visual observation. The orientation of the rest of the vehicles in the vehicle group may be ascertained relative to the first vehicle's orientation. The orientation of the first vehicle (L1) can be used to determine which direction the vehicle group will move when the first vehicle (L1) begins to move.

In one embodiment, when a consist message is received by the controller of a vehicle during initialization of the vehicle, one or more (or all) other vehicles in the vehicle group in which the vehicle may be located can be identified or known by the controller from the consist message. In one embodiment, the vehicles exchange an electronic handshake when joining (and optionally leaving) the vehicle group. The controller of a control vehicle in the vehicle group can request/gather vehicle position report messages from the other vehicles in the vehicle group or consist. The controller can issue a new query message (vehicle-to-vehicle) or query the back-office server for the information about the vehicles in the vehicle group. A group of the most recent position reports for each vehicle, e.g., about three position reports, may be sent to provide a better distribution for the analysis to determine the track, lane or envelope in or on which the vehicle group may be located, the relative position of the vehicles within the group, and their relative orientations. In another embodiment, suitable reports may include information about the vehicles (type, weight, stopping capabilities, min/max/optimum speeds, cargo type, cargo amount, health status, brake condition, fuel level, fuel type, final destination, and the like).

In one embodiment, the controller of a control vehicle can determine the direction of travel of the vehicle group by comparing the position of the vehicles in the vehicle group. For example, vehicle orientation and a throttle position of the first vehicle (L1) may be determined, and the controller can determine the direction of travel of the vehicle group without the vehicle group needing to move to predict an expected direction of travel. By predicting movement (before actually moving), the controller may improve safety and efficiency.

The position reports from multiple vehicles known to be in the same vehicle group can be used to determine a direction of travel for the vehicle group. The information about the vehicles in the vehicle group, such as the consist information, may provide the position of each vehicle in the vehicle group with the first control vehicle (L1) being designated as position 1. By comparing the relative positions of each vehicle in the same vehicle group, after translating them to a lane or track location, a direction of travel may be determined. The reverse is also possible. In FIG. 4, knowing that vehicle L1 is in position 1 and L5 is in position 10, and position reports from each indicating the direction of travel for the vehicle group, the system can be determined that forward movement of the vehicle group would be from L5 toward L1.

By analyzing the vehicle position data of the vehicle group, the controller of one or more of the control vehicles can determine that the vehicle group including the control vehicles may be on Siding 3, with Vehicle 1 being the lead vehicle, and that the direction of travel would be to the left if the Vehicle 1 were throttled up and the reverser handle was in the forward position. Direction of travel may be vehicle group specific. A step in determining direction of movement of the vehicle group may be to couple the direction of travel with the orientation and throttle position of the first vehicle (L1) to determine which way the vehicle group will move. This can be done before the vehicle group moves. The position information showing a change from L1 and L5 enables a determination that forward direction of travel for the vehicle group will be from L5 toward L1, and the opposite direction for reverse. Moving the vehicle group to the left or right can be accomplished in a similar manner. In some embodiments, moving the vehicles up and down may be accomplished. If the orientation of the first vehicle is toward front and the throttle is in forward, or if the orientation of the first vehicle is back and throttle is in reverse, the vehicle group's direction of movement will be from L5 toward L1. Conversely, if the orientation of the first vehicle may be front and handle position may be reverse or if the orientation of the first vehicle may be back and the handle position may be forward, the direction of movement of the vehicle group will be from L1 toward L5.

Figure 5:
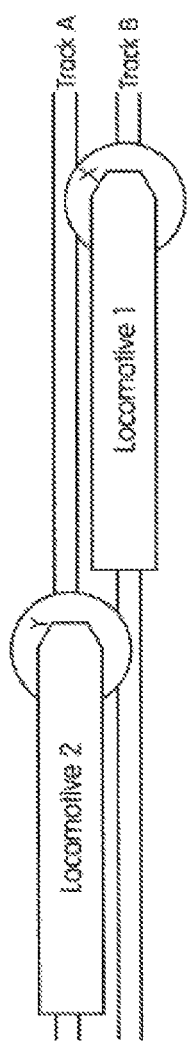
FIG. 5 is a schematic view of a vehicle group in an example track network according to one embodiment.

In one example, the controller may receive or determine a second location associated with a second control vehicle of a second vehicle group in the route network. It may determine the lanes or routes on which one or more members of the vehicle group may be located based at least partly on the second location associated with the second vehicle. For example, an uncertainty in the route location of a vehicle group can be reduced if position reports from vehicles of other vehicle groups nearby the vehicle group in the route network may be considered in determining the route location of the vehicle group. Referring to FIG. 5, the controller of the first control vehicle can determine, based at least partly on the additional location (Position Y in FIG. 5) associated with the second control vehicle, an amount of skew associated with the location (Position X in FIG. 5) of the first vehicle and adjust the location associated with the first vehicle based on the determined skew.

During operation, it may be unclear based on the position information, i.e., Position X, associated with Vehicle 1 whether Vehicle 1 may be on route B or route A. The controller of the Vehicle 1 can analyze the location information associated with the Vehicle 1 against the location information of one or more other nearby vehicles to determine an amount of skew in the location information of the vehicles. The positions associated with Vehicle 1 and the nearby vehicles may be skewed in the same direction. Vehicle 2 as shown in FIG. 5 must to be on Route A based on the location information (Position Y) associated therewith and the layout of the routes A and B. The controller and/or the back-office server can determine based on the Position Y and route centerline data for route A that the location information associated with Vehicle 2 (Position Y) may be skewed a certain distance and direction from the route centerline of Route A, and determine that the location information associated with Vehicle 1 (Position X) may be skewed the same distance and direction, i.e., the same distance and direction that would move Position Y to the centerline of Route A. The controller and/or the back-office server can adjust the Position X based on determined distance and direction of the skew to move the location information (Position X) to the centerline of Route B, and determine based on the adjusted location information associated with the Vehicle 1 that the Vehicle 1 may be on Route B.

Second location information associated with the second vehicle can include a plurality of second locations associated with the second vehicle over a period of time. For example, the controller of Vehicle 1 can analyze the position information associated with other vehicle groups in addition to, or in place of, the vehicle groups of which Vehicle 1 and Vehicle 2 are members. This second location information may include other vehicles on other tracks or in other lanes to determine an amount of skew or drift associated with their position information. With that, a correction factor may be determined, and the controller may adjust the position information based on the determined skew or drift. The controller may identify the second vehicle of the second vehicle group in the route network based on, for example, a distance of the second vehicle of the second vehicle group from the other vehicle, a freshness of the information, or other factors that emulate the current situation. The controller of Vehicle 1 or can use a proximity algorithm to find vehicles within a threshold distance, e.g., 1,000 ft., of the first vehicle and the position reports of the vehicles identified to be within the threshold distance can be requested from the vehicles and/or the back-office server and analyzed to determine the route location of the Vehicle 1.

In another example, the controller may determine a position of an intersection or a switch proximate to the vehicle group based at least partly on the location associated with the vehicle and the other location associated with the other vehicle. If the controller of a control vehicle determines that a first consist is on Main 1 and a second consist is on Main 2, and there is not an ambiguous route under the vehicle group, the controller or the back-office server can determine the position of the intersection or switches involved. This may improve the safety of the vehicle network control system by enabling the enforcement of any speed or other restrictions under the vehicle group instead of waiting until the vehicle group has traveled the length of the vehicle group.

In one embodiment, when there may be multiple vehicles known to be in the same vehicle group or consist, the position reports of the vehicles may determine which route those vehicles are occupying. If there is an intersection or a switch between the groups of vehicles, the operation of the traffic signal equipment and/or alignment of the switch may be determined. For three vehicles known to be in the same vehicle group and in positions 1, 2, and 3, the position reports of the three vehicles in the same vehicle group may be used to determine that those vehicles are on Route A or to control the vehicles to be on Route A. However, for three other vehicles known to be in the same vehicle group at positions 98, 99, and 100, the relative position reports of the three other vehicles in the same vehicle group may be used to determine that the other vehicles may be on Route B or to control the vehicles to be on Route B. If the route database shows that there are no connections between Route A and Route B, an error condition may be detected or identified, and route selection/direction of travel may be discarded and/or an alert generated. However, if the route database shows two switches connecting Route A and Route B between the positions of the vehicles at the front (1, 2, and 3) and the other vehicles at the rear (98, 99, and 100), The controller can determine the alignment of the two switches to be reverse for each switch, because that may be the only possible path based on route selection and the vehicles/vehicles known to be in the same vehicle group. Once identification of a route or lane is made, the controller may cause the vehicle(s) to switch lanes or routes if not on a desired route or lane.

As used herein, the terms "communicatively coupled", "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. Additionally, two units or devices may be in communication with each other even though the data transmitted may be modified, processed, routed, etc., between the first and second unit or device. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. Suitable electronic communication protocols and/or algorithms may be used. Examples may include TCP/IP (including HTTP and other protocols), WLAN (including 802.11 and other radio frequency-based protocols and methods), analog transmissions, and/or the like. It is to be noted that a "communication device" includes any device that facilitates communication (whether wirelessly or hard-wired (e.g., over the rails of a track, over a vehicle powerline extending)) between two vehicles. A suitable "communication device" is a radio transceiver programmed, configured, or adapted to wirelessly transmit and receive radio frequency signals and data over a radio signal communication path.

The system and computer-implemented method for determining a track location and a direction of travel described herein may be implemented in a variety of systems and vehicular networks; however, the systems and methods described herein are useful in connection with a railway system and track network, a roadway system and traffic control system, a mine, waterway navigation and shipping lanes, and aircraft and drone operation within flying envelopes. The systems and methods described herein are useful in connection with and/or at least partially implemented on one or more control vehicles or cars that make up a vehicle group. Multiple control vehicles or cars may be included in the vehicle group to facilitate the reduction of the vehicle group to match with passenger, freight, or some other demand or requirement. Further, the method and systems described herein can be used in connection with commuter vehicle groups, freight vehicle groups, bus fleets, truck fleets, passenger vehicles, drone swarms, and/or other vehicle group arrangements and systems. Still further, the vehicle group may be separated into different configurations (e.g., other vehicle groups) and moved in either a first direction and/or a second direction (that is, forward or backward, left or right, up or down). Any configuration or arrangement of vehicles, control cars, and/or railroad cars may be designated as a vehicle group, platoon, and/or a consist.

One embodiment of the inventive subject matter described herein provides a system, method, and apparatus for determining a location of a vehicle group, and particularly, a location of an end of the vehicle group. The system can include a plurality of passive transponders located throughout a route network that each include transponder data uniquely identifying a route segment or location where the transponder is positioned, such as, but not limited to, a portion of a route, a switch, an intersection, a region, coordinates, and/or the like. The transponder data may be any type of data that uniquely identifies a route segment or location and that may include a unique identifier that can be correlated with a route location from a route database. Moreover, the transponders may be located anywhere throughout a route network and, in a preferred and non-limiting embodiment, may be located adjacent a clearance point of a switch or adjacent a route segment approaching a clearance point of a switch. It will be appreciated, however, that transponders may be positioned at other locations throughout the route network to control movement of multiple vehicle groups by establishing boundaries that may be used to hold vehicle groups in a particular location for traffic control.

A vehicle groups can include an end-of-group device such as an end-of-train (EOT) device. The description below relates to an EOT device, but not all embodiments are limited to trains. The EOT device can represent a device onboard another type of vehicle group, as described herein. The EOT device can be arranged at an end of the vehicle group (e.g., on an end of a rear railcar) that includes a signal receiving device. The passive transponders and signal receiving device are configured such that when a vehicle group is traveling on a track, the signal receiving device activates and receives data from the stationary transponders. Thus, the transponders may be located on the route, adjacent the route, or in sufficient proximity to the route such that the signal receiving device is able to communicate with the transponders. Using the transponder data stored on the transponders, an on-board computer on the vehicle group and/or the EOT device determines a location of the vehicle group and, particularly, a location of an end of the vehicle group relative to the route. By using passive transponders rather than active wayside equipment, less maintenance is required.

Figure 6:
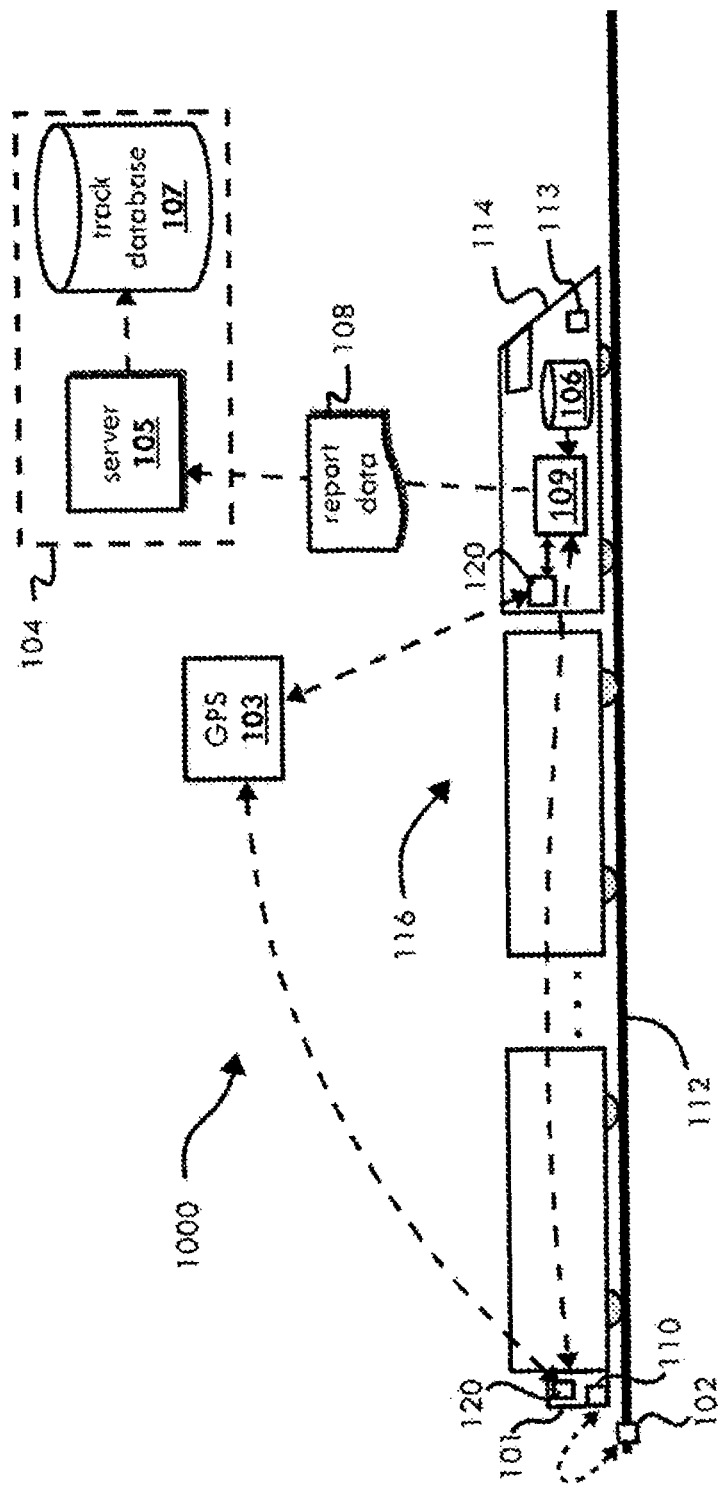
FIG. 6 illustrates a schematic diagram of one embodiment of a system for determining a position of a vehicle group device according to one embodiment.

Referring to FIG. 6, a system 1000 for determining a location of a vehicle group 116 is shown according to a preferred and non-limiting embodiment or aspect. The vehicle group 116 is traveling on a route 112 and includes a propulsion-generating vehicle 114 (e.g., a locomotive, truck, automobile, boat, etc.) and an EOT device 101. An on-board computer 109 located in the vehicle 114 is in communication with a route database 106 in the vehicle 114 or elsewhere on the vehicle group 116, and a remote back office system 104. The EOT device 101 includes a signal receiving device 110 which communicates with a transponder 102 when in sufficient proximity to the transponder 102. In one embodiment, an additional signal receiving device 113 may be located in the vehicle 114 or another vehicle (e.g., a non-propulsion-generating vehicle) and may be configured to communicate with the transponder 102.

With continued reference to FIG. 6, the transponder 102 may include any signal emitting device that communicates data in response to being activated. For example, the transponder 102 may be a passive radio frequency identification (RFID) transponder (e.g., tag) and the signal receiving device 110 may be an RFID reader that energizes the transponder 102 to retrieve data stored thereon. It will be appreciated, however, that the transponder 102 may include any number of signal-emitting devices such as, for example, near field communication (NFC) tags, low-power Bluetooth® devices, and/or the like, and that the signal receiving device 110 may include any device capable of communicating with the transponder 102. The plurality of transponders 102 located throughout the route network may be the same type of transponder or, in other examples, may differ such that more than one type of signal receiving device 110 is used in the EOT device, or the signal receiving device 110 may be programmed or configured to communicate with different types of transponders 102 using different communication protocols. It will be appreciated that other variations are possible.

In some non-limiting examples, a plurality of printed data sources (e.g., a two- or three-dimensional barcode, a visual code, printed text, etc.) may be used. In such examples, the EOT device is configured to illuminate the printed data source (e.g., with an infrared light or another light source) and capture the data printed thereon with an image capture device. The EOT device and/or on-board computer may then decode and/or process the captured image to obtain the data encoded or printed thereon.

Still referring to FIG. 6, the on-board computer 109 may be in communication with a positioning system, such as a Global Positioning System (GPS) satellite 103 (wherein the on-board computer 109 is in communication with a GPS receiver 120 on the vehicle group 116), to determine or receive positional coordinates of the vehicle group 116. Various other techniques may also be used to determine the position of the vehicle group 116 such as, for example, axle counters, signal triangulation, wheel tachometers, and/or the like. The on-board computer 109 may use data received from the transponders 102 to confirm and/or verify the location of the vehicle group as determined by GPS and/or other methods. In this manner, the transponders 102 may be used as a failsafe mechanism for verifying that the location of the vehicle group 116, as determined by the GPS, axle counters, signal triangulation, wheel tachometers, and/or the like, is correct.

The location of the vehicle group 116, as determined by GPS and/or other methods, may also be used to determine when a transponder 102 is expected to be encountered. This provides information for the EOT device 101 to anticipate a transponder 102 so that the device 101 can activate the transponder 102 at the appropriate time. Because activating a transponder 102 utilizes power, attempting to activate a transponder 102 only when the transponder 102 is anticipated or expected, rather than continually or repeatedly, minimizes or reduces the amount of power that the EOT device 101 consumes. Optionally, the transponders 102 may also be used as a primary source for determining vehicle group location, and that GPS and/or other like devices and methods may be used to confirm such determinations or may not be used at all. A GPS receiver 120 may be located in the vehicle 114 and/or the EOT device 101. The location data received from both GPS receivers 120 may be used to determine or confirm the length of the vehicle group 116. Methods for determining the overall length of a vehicle group are described in U.S. Pat. No. 6,081,769 to Curtis, the disclosure of which is hereby incorporated by reference in its entirety.

The back office system 104 can include a back office system server 105 and a remote route database 107. The on-board computer 109 generates report data 108 and communicates this data to the back office system server 105, which stores the report data 108 or a portion thereof in the remote route database 107. The report data 108 may include the transponder data and/or be generated by the on-board computer 109 based on various inputs including, for example, the transponder data obtained from the signal receiving device 110. The report data 108 may also include raw, unprocessed data received from the signal receiving device 110 (e.g., the transponder data itself), or may be processed and/or combined with other data by the EOT device 101 and/or on-board computer 109. Moreover, in preferred and non-limiting embodiments or aspects, the EOT device 101 may also be in communication with the back office system 104 and may transmit report data 108 received from the transponder 102 and/or derived from the transponder data directly to the back office system server 105 upon receiving the data or at intervals.

The report data 108 may be communicated to the back office system server 105 as the data is received and/or determined, or may be communicated at a predetermined interval or time period. For example, once a position of the EOT device 101 is confirmed to have passed a transponder 102 (or some other location on the route 112), the on-board computer 109 and/or EOT device 101 may transmit the report data 108 to the back office system server 105 where the data is stored in the remote route database 107. The report data 108 can then be used by the back office system server 105, other remote systems, and/or personnel to make decisions for safely moving switches or routing vehicle groups through the route network. The back office system server 105 and/or other remote systems may implement one or more algorithms for generating vehicle group and/or switch commands based on the report data 108.

The transponder data stored on or otherwise accessible to the transponders 102 include a unique identifier that uniquely identifies the transponder 102 and/or a location of the transponder 102. For example, a unique identifier from a transponder may correspond to a route location in the route database(s) 106, 107, such that the position of the vehicle group 116, and particularly the position of the front and/or end of the vehicle group 116, can be correlated with the route database(s) 106, 107. In a non-limiting example, the route database(s) 106, 107 include identifiers corresponding with route locations (e.g., geographic locations, landmark-based locations, specific route segments or switches, etc.), such that the unique identifier from the transponder data may be matched to an identifier in the route database(s) 106, 107 to determine a route location. Unique identifiers may be in any suitable format such as, for example, integers, alphanumeric strings, coordinates, and/or the like. In this manner, the on-board computer 109 may receive the transponder data from a transponder 102, extract or determine a unique identifier from the transponder data, and look-up the unique identifier on the on-board route database 106 to find a corresponding identifier associated with a route location. The on-board computer 109 may then generate the report data 108 based on the unique identifier and/or corresponding information retrieved from the route database. Transponder data may alternatively or additionally be correlated with the remote route database 107.

In a preferred and non-limiting embodiment or aspect, a failsafe protocol may be implemented by the on-board computer 109 and/or EOT device 101 to confirm the detection of a transponder 102. In such embodiments or aspects, a signal receiving device 113 in the vehicle 114 and a signal receiving device 110 in the EOT device 101 may both detect and/or obtain transponder data from the transponders 102. The on-board computer 109 and/or EOT device 101 may then compare the transponder data and/or ensure that transponder data is received by both signal receiving devices 110, 113.

Figure 8:
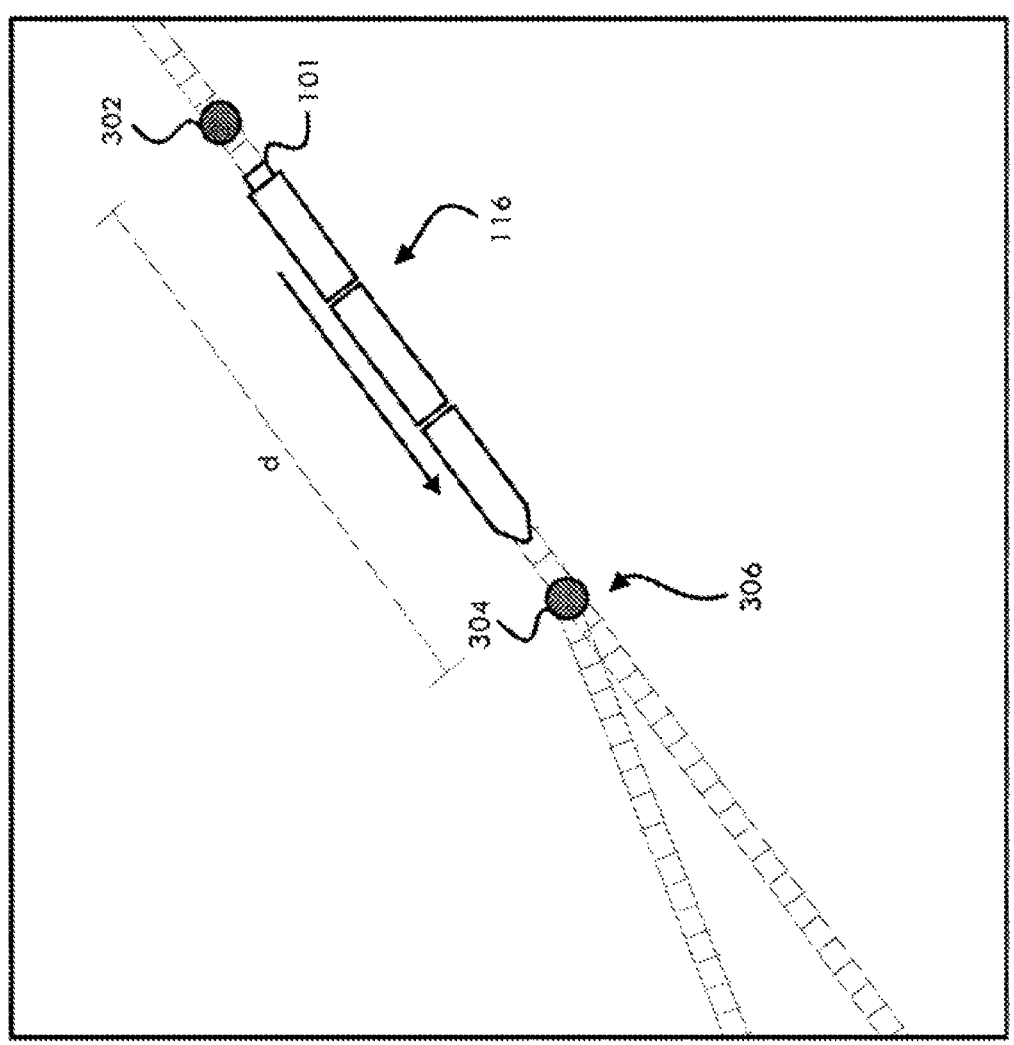
FIG. 8 illustrates a vehicle group traveling in a route network according to one embodiment.

Referring to FIG. 8, a vehicle group 116 traveling in a route network is shown according to a preferred and non-limiting embodiment or aspect. A clearance transponder 304 may be located at a clearance point of a switch 306 in the route network to facilitate a determination of when the vehicle group 116 has passed the clearance point. A switch 306 may have two clearance points, one for each leg of the switch 306, and therefore two clearance transponders. Depending on which leg of the switch the vehicle group was traveling, one of the two clearance transponders may be activated. Once it is determined that the vehicle group 116 has passed the clearance transponder 304, and therefore the clearance point, the switch 306 can be moved or another vehicle group can be routed on the associated route segment. An approach transponder 302 is located at a distance (d) from the switch 306 on the route, and the clearance transponder 304 is located substantially proximate to the switch 306. It will be appreciated that the clearance transponder 304 may also be located at a distance past the switch 306 or elsewhere. The EOT device 101 at the end of the vehicle group 116 has a signal-receiving device (not shown) for receiving data from the transponders 302, 304.

After passing over the approach transponder 302, the signal-receiving device obtains transponder data from the transponder 302. The transponder data received from the approach transponder 302 may be used to confirm that the signal receiving device is working properly as the vehicle group 116 approaches a clearance transponder 304 located at a clearance point of the switch 306, and to indicate to the EOT device 101 and/or on-board computer of the vehicle group 116 that detection of another transponder (e.g., the clearance transponder 304) can be expected. For example, approach transponder 302 may be located at a distance (d) from the switch 306 or another clearance point to account for GPS position errors. After detecting the approach transponder 302, the on-board computer and/or EOT device 101 of the vehicle group 116 may then utilize a method or device for determining the distance traveled, such as but not limited to a wheel tachometer, to independently determine when the clearance point associated with the clearance transponder 304 can be expected. Two or more transponders may be used in any given location or region for redundancy. Transponders may also be used in connection with other clearance points, such as vehicle group stations, authority blocks, and/or the like.

Figure 7:
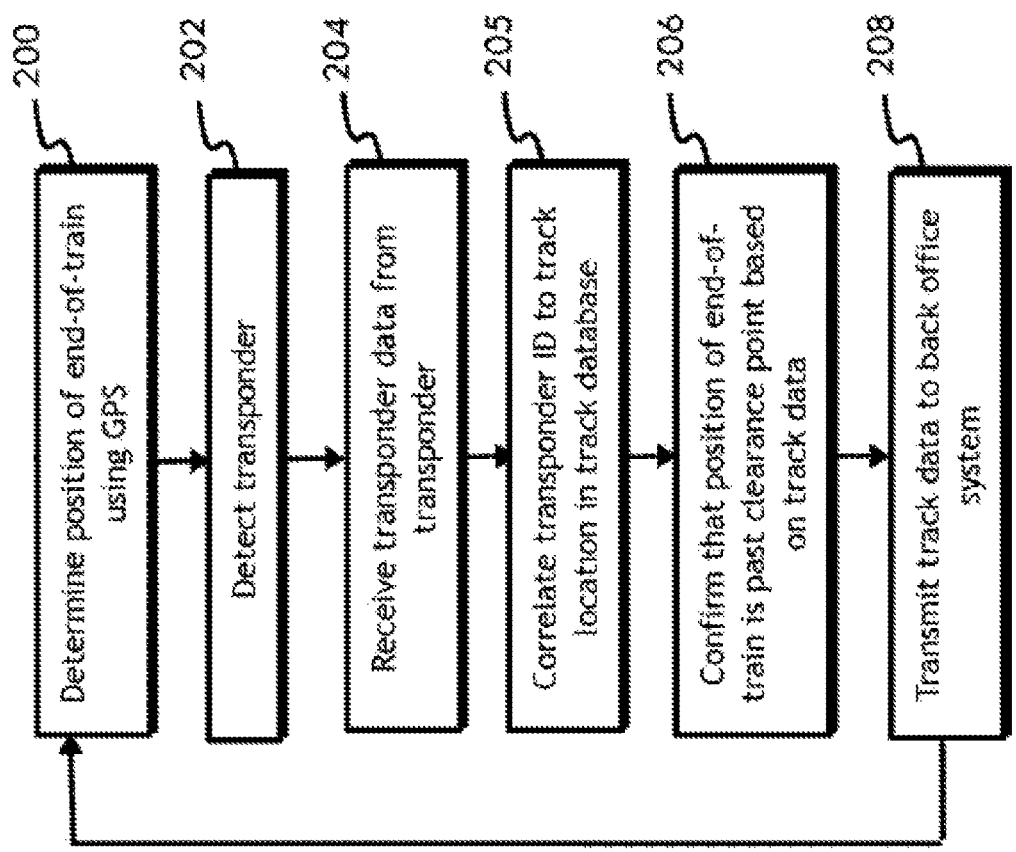
FIG. 7 illustrates a flowchart of a method for determining a position of a vehicle group device according to one embodiment.

Referring now to FIG. 7, a method for determining the location of an EOT device is shown according to a preferred and non-limiting embodiment or aspect. At 200, the position of the EOT device is determined using GPS or another suitable method. At 202, the EOT device detects a stationary transponder in the route network. At 204, the EOT device receives transponder data from the transponder by, for example, activating a passive transponder. At 205, the on-board computer, EOT device, and/or another computing device correlates a unique identifier from the transponder data to a route location in a route database. At 206, the on-board computer, EOT device, and/or another computing device may confirm that the position of the EOT device is past a clearance point based on the transponder data received from the transponder and the corresponding route location retrieved from the route database. At 208, the transponder data may be submitted to a back office system.

The on-board computer determines that the position of the vehicle group and/or EOT device is past a particular route segment. The on-board computer may also use the EOT device position to release authority for a following vehicle group to use the route segment. Thus, the data submitted to a back office system may include a location of the front of the vehicle group, a location of the end of the vehicle group (or EOT device), and/or a release of movement authority.

Referring now to FIG. 9, a method for determining the location of an EOT device using an approach transponder is shown according to a preferred and non-limiting embodiment or aspect. At 400, a first transponder (e.g., an approach transponder) is detected by a signal receiving device. At 402, transponder data is received from the first transponder. Using this transponder data, the operability of the signal receiving device can be confirmed. At 404, the distance traveled by the vehicle group is measured using, for example, any suitable method or device for determining the distance traveled, such as, but not limited to, a wheel tachometer. Then, at 406, a second transponder is detected at a clearance point. Transponder data is then received from the second transponder at 408. At 410, at least a portion of the transponder data, such as but not limited to an indication that the vehicle group has passed the clearance point, is transmitted to a back office system.

The system 1000 for determining a location of a vehicle group 116 can be used for implementing moving block vehicle group control without the need for active wayside equipment. By determining the locations of vehicle groups throughout a route network with the system 1000, one or more movement authorities may facilitate movement of the vehicle groups at a closer proximity.

In non-limiting embodiments or aspects, a method to determine the location of a vehicle group may be performed by at least one non-transitory computer-readable medium including program instructions that, when executed by at least one processor, cause one or more devices to perform the steps. With the sole exception of transitory propagating signals, a non-transitory computer-readable medium may include any medium capable of storing data such as, but not limited to, random-access memory (RAM), read-only memory (ROM), hard drives, compact and floppy discs, and/or other like mediums.

Reference is made in detail to various embodiments of the inventive subject matter, examples of which are illustrated in the accompanying drawings. The same reference numerals used throughout the drawings may refer to the same or like parts. As disclosed below, multiple version of a same element may be disclosed. Likewise, with respect to other elements, a singular version may be is disclosed. Neither multiple versions disclosed, nor a singular version disclosed shall be considered limiting. Although multiple versions are disclosed, a singular version may be utilized. Likewise, where a singular version is disclosed, multiple versions may be utilized. The terms "upper", "lower", "right", "left", "vertical", "horizontal", "top", "bottom", "lateral", "longitudinal" and derivatives thereof shall relate to the invention as it is oriented in the drawing figures.

The description is illustrative and not restrictive. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Other embodiments may be apparent to one of ordinary skill in the art upon reviewing the above description. The scope of the inventive subject matter should, therefore, be determined with reference to the appended claims, along with the full scope of equivalents to which such claims are entitled.

The terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure. And, as used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the inventive subject matter and to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A controller configured to:
   receive or determine a first location value associated with at least a first vehicle in a vehicle group;
   receive or determine a second location value associated with at least a second vehicle;
   determine a route or lane from a plurality of possible routes or lanes on which the vehicle group is located based at least partly on the first location value and on the second location value;
   determine a level or degree of uncertainty or inaccuracy of at least one of the first location value or the second location value; and
   respond to a calculation of the level or degree of uncertainty or inaccuracy that is greater than a determined threshold value by one or more of: generating an alert; switching an operating mode of one or more vehicles in the vehicle group to a safe stop mode, or requesting additional location information to reduce the level or degree of uncertainty or inaccuracy to less than the determined threshold value.

2. The controller of claim 1, wherein one or more of the first location value or the second location value represents multiple, different locations at different times, and the controller is further configured to:
   determine a distribution of one or more of the first location value or the second location value;
   normalize the distribution of the one or more of the first location value or the second location value to route centerline data; and
   determine the route or lane from the plurality of possible routes or lanes based at least partly on the distribution that is normalized.

3. The controller of claim 1, wherein the controller is further configured to determine the route or lane from the plurality of possible routes or lanes on which the vehicle group is located based at least partly on a spatial relationship between the first vehicle and the second vehicle.

4. The controller of claim 1, wherein the controller is disposed on the first vehicle, and is further configured to:
   receive or determine a direction of orientation of the first vehicle;
   receive or determine a throttle position of the first vehicle; and
   determine, based at least in part on the direction of orientation and on the throttle position, a direction of travel of the vehicle group on the route or lane.

5. The controller of claim 1, wherein the first location value represents an initial first location and the second location value represents an initial second location, and the controller is further configured to:
   determine an amount of skew or drift associated with one or more of the initial first location or the initial second location; and
   adjust the one or more of the first location or the second location based at least in part on the amount of skew or drift that is determined to generate one or more of an adjusted first location or an adjusted second location.

6. The controller of claim 1, wherein the route or lane on which the vehicle group is located comprises a first route segment connected to a second route segment by at least one switch or intersection, and wherein the controller is further configured to:
   determine an alignment or operating mode of the at least one switch or intersection based at least partly on a spatial relationship of the first vehicle and the second vehicle, the first location value, and the second location value.

7. The controller of claim 1, wherein the controller is disposed onboard the first vehicle and is configured to transmit a query message to one or more of: (i) at least one other vehicle in the vehicle group or (ii) a remote back office server, and
   wherein the query message requests a position report message including a location associated with the at least one other vehicle.

8. The controller of claim 1, wherein the controller is a remote server and is configured or operable to communicate with the vehicle group, and
   the controller is further configured to determine the route or lane from the plurality of possible routes or lanes on which or in which the vehicle group is located based at least partly on the first location value and the second location value, and at least partly on one or more of:
   a relative position of the first vehicle to the second vehicle, a relative position of the first vehicle to a wayside device or beacon, a relative position of the first vehicle to a determined landmark, or trend information including a previous known position of the first vehicle, a time associated with the previous known position of the first vehicle, an orientation of travel of the first vehicle or the vehicle group relative to the route or lane, and a distance or speed of travel of the first vehicle or the vehicle group.

9. The controller of claim 1, wherein the controller is further configured to determine which of the routes or lanes are occupied by different vehicles in the vehicle group.

10. The controller of claim 1, wherein the controller is further configured to determine the route or lane from the plurality of possible routes or lanes on which or in which the vehicle group is located based at least partly on the first location value and the second location value, and at least partly on vehicle information associated with the vehicle group, wherein the vehicle information includes at least one of vehicle type, vehicle weight, vehicle stopping capability, vehicle minimum speed, vehicle maximum speed, vehicle designated speed, vehicle cargo type, vehicle cargo amount, vehicle health status, vehicle brake condition, vehicle fuel level, vehicle fuel type, or vehicle final destination.

11. The controller of claim 1, wherein the controller is further configured to determine the route or lane from the plurality of possible routes or lanes on which or in which the vehicle group is located based at least partly on the first location value and the second location value, and at least partly on a route database, wherein the route database comprises information associated with one or more of:

route position or location, route grade, route curvature, number of lanes for a route segment, location of intersections and switch locations in a route segment, crossing locations in a route segment, or vehicle group make up and vehicle identification.

12. The controller of claim 1, wherein the controller is further configured to determine the route or lane from the plurality of possible routes or lanes on which or in which the vehicle group is located based at least partly on the first location value and the second location value, and at least partly on additional information selected from:

route heading changes, a number of control vehicles in the vehicle group, identification numbers of one or more of the control vehicles in the vehicle group, a number of non-control vehicles in the vehicle group, identification numbers of one or more of the non-control vehicles in the vehicle group, a length of the vehicle group, a width of the vehicle group, manifest information for one or more vehicles in the vehicle group, freight type and amounts carried by one or more vehicles in the vehicle group, passenger information for passengers carried by one or more vehicles in the vehicle group, model and type of propulsion systems carried by one or more vehicles in the vehicle group, vehicle fuel levels, vehicle equipment health and status, or age of equipment carried by one or more vehicles in the vehicle group.

13. The controller of claim 1, wherein the controller is further configured to determine which of the possible routes or lanes is occupied by the first vehicle or the second vehicle, determine whether the route or lane that is occupied by the first vehicle or the second vehicle is a correct route or lane, and to control the first vehicle or the second vehicle to switch from the route or lane that is occupied to the correct route or lane responsive to determining that the route or lane occupied by the first vehicle or the second vehicle is not the correct route or lane.

14. A system, comprising:

the controller as defined in claim 1 disposed on the first vehicle;

a positioning system coupled with the controller; and a communication device coupled with the controller and operable to communicate with one or more other vehicles in the vehicle group, one or more other vehicles that are not in the vehicle group, a wayside device, and a remote server.

15. A system for determining a direction of travel of a vehicle group including at least two control vehicles on a route network having a plurality of routes, the system comprising at least one computer programmed or configured to:

receive or determine a direction of orientation of at least one of the control vehicles relative to a first route of the routes;

receive or determine a throttle position of the at least one control vehicle; and determine a direction of travel of the vehicle group relative to the first route based on the direction of orientation and the throttle position.

16. The system of claim 15, wherein the computer is further programmed or configured to direct the at least one of the control vehicles to switch to a different, second route based at least in part on the direction of travel of the vehicle group that is determined.

17. A method, comprising:

receiving or determining an initial first location value associated with a first vehicle belonging to a vehicle group;

receiving or determining an initial second location value associated with a second vehicle;

determining a route or lane from a plurality of possible routes or lanes on which the vehicle group is located based at least partly on the first location value and on the second location value;

determining an amount of skew or drift associated with one or more of the initial first location or the initial second location; and determining one or more of an adjusted first location of the first vehicle or an adjusted second location of the second vehicle by adjusting the one or more of the first location or the second location based at least in part on the skew or drift that is determined.

18. The method of claim 17, further comprising determining the route or lane from the plurality of possible routes or lanes on which the vehicle group is located based at least partly on a spatial relationship between the first vehicle and the second vehicle.

* * * * *